United States Patent
Sagong et al.

(10) Patent No.: US 9,401,833 B2
(45) Date of Patent: Jul. 26, 2016

(54) METHOD AND APPARATUS FOR TRANSMITTING/RECEIVING SIGNAL IN WIRELESS COMMUNICATION SYSTEM

(71) Applicant: Samsung Electronics Co., Ltd., Gyeonggi-do (KR)

(72) Inventors: Min Sagong, Gyeonggi-do (KR); Won-Il Roh, Gyeonggi-do (KR); Jeong-Ho Park, Seoul (KR); Ji-Yun Seol, Gyeonggi-do (KR); Hyun-Kyu Yu, Gyeonggi-do (KR); Chi-Woo Lim, Gyeonggi-do (KR); Kyung-Whoon Cheun, Seoul (KR); Jae-Weon Cho, Gyeonggi-do (KR); Sung-Nam Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/253,812

(22) Filed: Apr. 15, 2014

(65) Prior Publication Data
US 2014/0307832 A1 Oct. 16, 2014

(30) Foreign Application Priority Data

Apr. 15, 2013 (KR) .......................... 10-2013-0041000

(51) Int. Cl.
  *H04L 27/36* (2006.01)
  *H04L 27/18* (2006.01)
  *H04L 27/10* (2006.01)
  *H04L 27/34* (2006.01)
(52) U.S. Cl.
  CPC .............. *H04L 27/18* (2013.01); *H04L 27/106* (2013.01); *H04L 27/34* (2013.01); *H04L 27/3488* (2013.01)

(58) Field of Classification Search
  CPC .... G06F 17/3071; G06F 13/38; H04L 1/0045
  USPC ............. 375/298, 295; 380/28; 370/335, 69.1
  See application file for complete search history.

(56) References Cited

U.S. PATENT DOCUMENTS

| | | | |
|---|---|---|---|
| 5,214,641 A * | 5/1993 | Chen et al. ................... | 370/484 |
| 8,340,231 B1 * | 12/2012 | Lee ....................... | H04L 25/061 375/262 |
| 2005/0075103 A1 | 4/2005 | Hikokubo et al. | |
| 2006/0129902 A1 * | 6/2006 | Lee ......................... | H04L 1/005 714/794 |

(Continued)

OTHER PUBLICATIONS

International Search Report dated Jun. 20, 2014 in connection with International Patent Application No. PCT/KR2014/003254, 4 pages.

(Continued)

*Primary Examiner* — Sam K Ahn
*Assistant Examiner* — Fabricio R Murillo Garcia

(57) ABSTRACT

One or more embodiments provides method for transmitting a signal by a transmitting apparatus in wireless a communication system supporting a modulation scheme based on a quadrature amplitude modulation (QAM) scheme and a frequency shift keying (FSK) scheme. The method includes determining at least one first bit which will be mapped to at least one QAM symbol and at least one second bit which will be mapped to at least one FSK symbol among bits included in an encoded input bit stream; and generating a modulation symbol by mapping the at least one first bit to the at least one QAM symbol and mapping the at least one second bit to the at least one FSK symbol based on a Hamming distance of the at least one second bit.

21 Claims, 8 Drawing Sheets

(56) References Cited

U.S. PATENT DOCUMENTS

| | | | |
|---|---|---|---|
| 2007/0002969 A1* | 1/2007 | Jeong | H04L 1/0041 375/298 |
| 2008/0095121 A1* | 4/2008 | Shattil | 370/335 |
| 2008/0212656 A1* | 9/2008 | Feher | 375/150 |
| 2008/0267316 A1* | 10/2008 | Golitschek Edler Von Elbwart et al. | 375/298 |
| 2009/0141829 A1 | 6/2009 | Feher | |
| 2009/0276687 A1* | 11/2009 | Kim | H03M 13/451 714/777 |
| 2010/0329448 A1* | 12/2010 | Rane et al. | 380/28 |
| 2011/0013505 A1* | 1/2011 | Dyson | H04J 13/12 370/208 |
| 2014/0068393 A1* | 3/2014 | Varnica | H03M 13/1108 714/786 |

OTHER PUBLICATIONS

Written Opinion of the International Searching Authority dated Jun. 20, 2014 in connection with International Patent Application No. PCT/KR2014/003254, 6 pages.

Asma Latif, "Hybrid QAM-FSK (HQFM) OFDM Transceiver with Low Papr", PhD thesis, Ghulam Ihaq Khan Institute of Engineering Sciences & Technology, Swabi, Jan. 2009, 177 pages.

Asma Latif, et al., "Error Rate Performance of Hybrid QAM-FSK in OFDM Systems Exhibiting Low PAPR", Science in China Series F: Information Sciences, Oct. 2009, vol. 52, Issue 10, pp. 1875-1880.

* cited by examiner

U.S. 9,401,833 B2

METHOD AND APPARATUS FOR TRANSMITTING/RECEIVING SIGNAL IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Apr. 15, 2013 assigned Serial No. 10-2013-0041000, the entire disclosure of which is incorporated herein by reference.

TECHNICAL FIELD

The present disclosure relates to a method and apparatus for transmitting/receiving a signal in a wireless communication system.

BACKGROUND

In a conventional wireless communication system, a Gaussian channel environment is assumed for an interference signal in order to perform a decoding operation with a low complexity. In the conventional wireless communication system, a quadrature amplitude modulation (QAM) series of modulation scheme is used in order that a characteristic of an interference signal becomes maximally close to Gaussian.

However, channel capacity of a non-Gaussian channel is greater than channel capacity of a Gaussian channel, so, if an accurate decoding operation is performed, a decoding performance better than a decoding performance on the Gaussian channel may be acquired on the non-Gaussian channel.

Modulation schemes among modulation schemes which modulate a related signal thereby an interference signal has a non-Gaussian characteristic are a frequency shift keying (FSK) scheme and a hybrid FSK and QAM modulation (FQAM) scheme.

The FQAM scheme is a hybrid modulation scheme in which the QAM scheme and the FSK scheme are combined, and has a high spectral efficiency of the QAM scheme and a characteristic of the FSK scheme in which a signal is modulated thereby an interference signal has a non-Gaussian characteristic.

However, in the FQAM scheme, it may not be possible that a bit-to-symbol mapping scheme is effectively used. So, if the FQAM scheme is used, a non-binary code with a large alphabet size should be used with the FQAM scheme in order to acquire a good bit-to-symbol mapping performance. Generally, a complexity of the non-binary code exponentially increases if an alphabet size increases, so there may be a need for a high processing complexity in order to enhance a performance of the FQAM scheme.

There may be a need for a method of transmitting/receiving a signal thereby enhancing a bit-to-symbol mapping performance and decreasing a processing complexity in a wireless communication system supporting a FQAM scheme.

SUMMARY

To address the above-discussed deficiencies, it is a primary object to provide a method and apparatus for transmitting/receiving a signal in a wireless communication system supporting an FQAM scheme thereby enhancing a bit-to-symbol mapping performance.

Another aspect of the present disclosure is to provide a method and apparatus for transmitting/receiving a signal in a wireless communication system supporting an FQAM scheme thereby decreasing a processing complexity.

Another aspect of the present disclosure is to provide a method and apparatus for transmitting/receiving a signal using a binary code in a wireless communication system supporting an FQAM scheme.

Another aspect of the present disclosure is to provide a method and apparatus for transmitting/receiving a signal in a wireless communication system supporting an FQAM scheme thereby directly mapping a bit sequence to an FQAM symbol.

Another aspect of the present disclosure is to provide a method and apparatus for transmitting/receiving a signal in a wireless communication system supporting an FQAM scheme thereby directly mapping a bit sequence to an FQAM symbol and enhancing a bit-to-symbol mapping performance.

Another aspect of the present disclosure is to provide a method and apparatus for transmitting/receiving a signal in a wireless communication system supporting an FQAM scheme thereby directly mapping a bit sequence to an FQAM symbol and decreasing a processing complexity.

Another aspect of the present disclosure is to provide a method and apparatus for transmitting/receiving a signal in a wireless communication system supporting an FQAM scheme thereby directly mapping a bit sequence to an FQAM symbol and decreasing latency.

In accordance with an aspect of the present disclosure, one or more embodiments provide a method for transmitting a signal by a transmitting apparatus in wireless a communication system supporting a modulation scheme based on a quadrature amplitude modulation (QAM) scheme and a frequency shift keying (FSK) scheme. The method includes determining at least one first bit which will be mapped to at least one QAM symbol and at least one second bit which will be mapped to at least one FSK symbol among bits included in an encoded input bit stream. The method also includes generating a modulation symbol by mapping the at least one first bit to the at least one QAM symbol and mapping the at least one second bit to the at least one FSK symbol based on a Hamming distance of the at least one second bit.

In accordance with another aspect of the present disclosure, one or more embodiments provide a method for receiving a signal by a receiving apparatus in wireless a communication system supporting a modulation scheme based on a quadrature amplitude modulation (QAM) scheme and a frequency shift keying (FSK) scheme. The method also includes receiving a modulation symbol from a transmitting apparatus. The modulation symbol is generated by the transmitting apparatus, and wherein the transmitting apparatus determines at least one first bit which will be mapped to at least one QAM symbol and at least one second bit which will be mapped to at least one FSK symbol among bits included in an encoded input bit stream. The transmitting apparatus also generates the modulation symbol by mapping the at least one first bit to the at least one QAM symbol and mapping the at least one second bit to the at least one FSK symbol based on a Hamming distance of the at least one second bit.

In accordance with another aspect of the present disclosure, one or more embodiments provide a transmitting apparatus for transmitting a signal in wireless a communication system supporting a modulation scheme based on a quadrature amplitude modulation (QAM) scheme and a frequency shift keying (FSK) scheme. The transmitting apparatus includes an encoder configured to encode an input bit stream. The transmitting apparatus also includes a modulator configured to determine at least one first bit which will be mapped to at least one QAM symbol and at least one second bit which will be mapped to at least one FSK symbol among bits included in an encoded input bit stream The modulator is also configured to generate a symbol by mapping the at least one first bit to the at least one QAM symbol and mapping the at least one second bit to the at least one FSK symbol based on a Hamming distance of the at least one second bit.

In accordance with another aspect of the present disclosure, one or more embodiments provide a receiving apparatus for receiving a signal in wireless a communication system supporting a modulation scheme based on a quadrature amplitude modulation (QAM) scheme and a frequency shift keying (FSK) scheme. The receiving apparatus includes a receiver configured to receive a modulation symbol from a transmitting apparatus. The modulation symbol is generated by the transmitting apparatus. The transmitting apparatus determines at least one first bit which will be mapped to at least one QAM symbol and at least one second bit which will be mapped to at least one FSK symbol among bits included in an encoded input bit stream, and generates the modulation symbol by mapping the at least one first bit to the at least one QAM symbol and mapping the at least one second bit to the at least one FSK symbol based on a Hamming distance of the at least one second bit.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
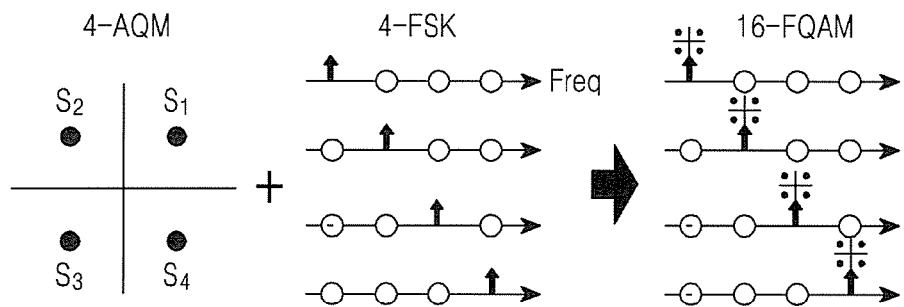
FIG. 1 schematically illustrates a basic concept of an FQAM scheme in a conventional wireless communication system.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. The following description with reference to the accompanying drawings is provided to assist in a comprehensive understanding of various embodiments of the present disclosure as defined by the claims and their equivalents. It includes various specific details to assist in that understanding but these are to be regarded as merely examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

An embodiment of the present disclosure proposes a method and apparatus for transmitting/receiving a signal in a wireless communication system supporting a hybrid frequency shift keying (FSK) and quadrature amplitude modulation (QAM) modulation (FQAM) scheme thereby enhancing a bit-to-symbol mapping performance.

An embodiment of the present disclosure proposes a method and apparatus for transmitting/receiving a signal in a wireless communication system supporting an FQAM scheme thereby decreasing a processing complexity.

An embodiment of the present disclosure proposes a method and apparatus for transmitting/receiving a signal using a binary code in a wireless communication system supporting an FQAM scheme.

An embodiment of the present disclosure proposes a method and apparatus for transmitting/receiving a signal in a wireless communication system supporting an FQAM scheme thereby directly mapping a bit sequence to an FQAM symbol.

An embodiment of the present disclosure proposes a method and apparatus for transmitting/receiving a signal in a wireless communication system supporting an FQAM scheme thereby directly mapping a bit sequence to an FQAM symbol and enhancing bit-to-symbol mapping performance.

An embodiment of the present disclosure proposes a method and apparatus for transmitting/receiving a signal in a wireless communication system supporting an FQAM scheme thereby directly mapping a bit sequence to an FQAM symbol and decreasing a processing complexity.

An embodiment of the present disclosure proposes a method and apparatus for transmitting/receiving a signal in a wireless communication system supporting an FQAM scheme thereby directly mapping a bit sequence to an FQAM symbol and decreasing latency.

A method and apparatus proposed in various embodiments of the present disclosure may be applied to various communication systems such as a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, an evolved packet system (EPS), a mobile internet protocol (Mobile IP) system, and/or the like.

A basic concept of an FQAM scheme in a conventional wireless communication system will be described with reference to FIG. 1.

FIG. 1 schematically illustrates a basic concept of an FQAM scheme in a conventional wireless communication system.

As illustrated in FIG. 1, an FQAM scheme includes a characteristic of a QAM scheme and a characteristic of an FSK scheme. For example, a 16-FQAM scheme based on a tetrad QAM scheme, i.e., a 4-QAM (quadrature phase shift keying (QPSK)) scheme and a 4-FSK scheme which uses four modulation frequencies is illustrated in FIG. 1.

Referring to FIG. 1, a constellation of a 4-QAM scheme includes four signal points S1, S2, S3, and S4 to which a modulated digital signal may be mapped. The four signal points have the same magnitude, and include complex modulation symbols (a, a), (−a, a), (−a, −a), (a, −a) which have a phase difference of 90 degrees between two adjacent signal points. For example, one of information bits 00, 01, 10, and 11 may be mapped to each of the four signal points.

In the 4-FSK scheme, each of information bits is transmitted through one of four different modulation frequencies. For example, each of information bits 00, 01, 10, and 11 may be transmitted through one of modulation frequencies $f_1$, $f_2$, $f_3$, and $f_4$.

In a 16-FQAM scheme based on the 4-QAM scheme and the 4-FSK scheme, four signal points $S_1$, $S_2$, $S_3$, and $S_4$ are transmitted through one of four modulation frequencies $f_1$, $f_2$, $f_3$, and $f_4$. That is, $S_1$, $S_2$, $S_3$, and $S_4$ are transmitted through a modulation frequency $f_1$, $S_1$, $S_2$, $S_3$, and $S_4$ are transmitted through a modulation frequency $f_2$, $S_1$, $S_2$, $S_3$, and $S_4$ are transmitted through a modulation frequency $f_3$, and $S_1$, $S_2$, $S_3$, and $S_4$ are transmitted through a modulation frequency $f_4$. So, in the 16-FQAM scheme, sixteen information units (i.e., four information bits) may be transmitted using a transmission resource with quantity equal to quantity of the 4-QAM scheme or the 4-FSK scheme.

The FQAM scheme is a modulation scheme in which information bits are mapped using a constellation and a frequency location. In FIG. 1, a single-tone FQAM scheme is illustrated, however, it will be understood by those of ordinary skill in the art that a multi-tone FQAM scheme in which information bits are mapped using various patterns of various frequencies may be implemented.

So, the FQAM scheme may include all of the single-tone FQAM scheme and the multi-tone FQAM scheme.

In a wireless communication system, a QAM scheme is generally used based on a binary code, and an FQAM scheme is generally used based on a non-binary code. This will be described with reference to FIGS. 2 and 3.

A structure of a transmitter/receiver in a wireless communication system supporting a conventional QAM scheme will be described with reference to FIG. 2.

Figure 2:
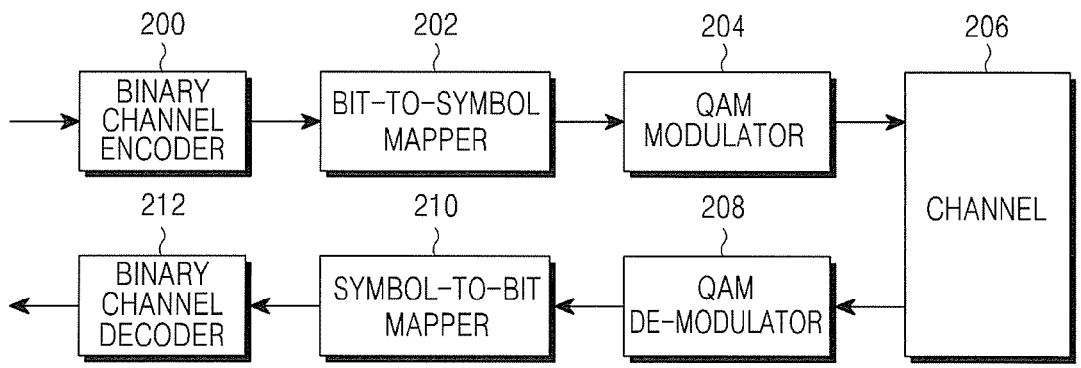
FIG. 2 schematically illustrates a structure of a transmitter/receiver in a wireless communication system supporting a conventional QAM scheme.

FIG. 2 schematically illustrates a structure of a transmitter/receiver in a wireless communication system supporting a conventional QAM scheme.

Referring to FIG. 2, a transmitter includes a binary channel encoder 200, a bit-to-symbol mapper 202, and a QAM modulator 204, and a receiver includes a QAM de-modulator 208, a symbol-to-bit mapper 210, and a binary channel decoder 212.

A binary bit stream which the transmitter intends to transmit is input to the binary channel encoder 200; the binary channel encoder 200 generates an encoded bit stream by encoding the input binary bit stream based on a preset encoding scheme, and outputs the encoded bit stream to the bit-to-symbol mapper 202. The bit-to-symbol mapper 202 maps each of bits included in the encoded binary bit stream to a symbol based on a preset mapping scheme to output bits mapped to the symbol to the QAM modulator 204. The QAM modulator 204 modulates the bits mapped to the symbol based on a QAM scheme to generate QAM symbols. The QAM symbols are transmitted to the receiver through a channel 206.

If the QAM symbols are received in the receiver through the channel 206, the QAM de-modulator 208 generates de-modulated QAM symbols by de-modulating the received QAM symbols corresponding to the QAM scheme used in the QAM modulator 204, and outputs the de-modulated QAM symbols to the symbol-to-bit mapper 210. The symbol-to-bit mapper 210 generates a bit stream corresponding to the bit-to-symbol mapping scheme used in the bit-to-symbol mapper 202, and outputs the bit stream to the binary channel decoder 212. The binary channel decoder 212 decodes the bit stream corresponding to the encoding scheme used in the binary channel encoder 200.

The transmitter/receiver in FIG. 2 has been used for maximizing a bandwidth efficiency in a multi-cell system of which interference is not relatively large. The transmitter/receiver is generally used along with a Gaussian de-modulator since the transmitter/receiver holds a characteristic of an interference signal as a Gaussian characteristic.

Various optimized bit-to-symbol mapping schemes have been already proposed, so there is little deference between a performance when the transmitter/receiver uses a binary code and a performance when the transmitter/receiver uses a non-binary code. So, the transmitter/receiver has been implemented and used along with the binary code with a low complexity.

Since the transmitter/receiver holds the characteristic of the interference signal as the Gaussian characteristic, the transmitter/receiver may not acquire a high decoding performance due to a high channel capacity of a non-Gaussian channel in an environment with a severe interference.

A structure of a transmitter/receiver in a wireless communication system supporting a conventional FQAM scheme will be described with reference to FIG. 3.

Figure 3:
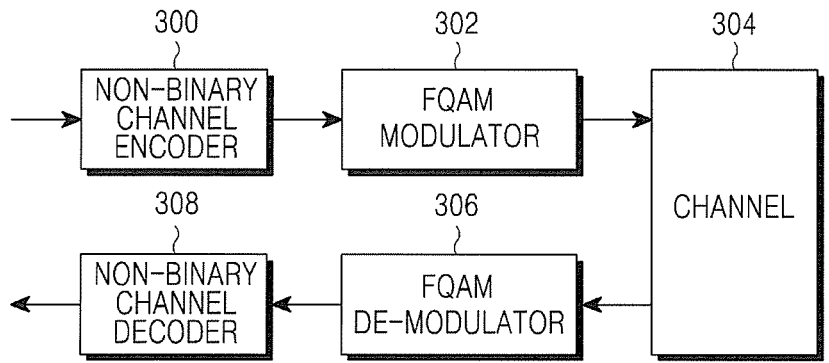
FIG. 3 schematically illustrates a structure of a transmitter/receiver in a wireless communication system supporting a conventional FQAM scheme.

FIG. 3 schematically illustrates a structure of a transmitter/receiver in a wireless communication system supporting a conventional FQAM scheme.

Referring to FIG. 3, a transmitter includes a non-binary channel encoder 300, and an FQAM modulator 302, and a receiver includes an FQAM de-modulator 306, and a non-binary channel decoder 308.

A binary bit stream which a transmitter intends to transmit is input to the non-binary channel encoder 300; the non-binary channel encoder 300 generates an encoded non-binary bit stream by encoding the input non-binary bit stream based on a preset encoding scheme, and outputs the encoded non-binary bit stream to the FQAM modulator 302. The FQAM modulator 302 modulates the encoded non-binary bit stream based on an FQAM scheme to generate FQAM symbols. The FQAM symbols are transmitted to the receiver through a channel 304.

If the FQAM symbols are received in the receiver through the channel 304, the FQAM de-modulator 306 generates de-modulated FQAM symbols by de-modulating the received FQAM symbols corresponding to the FQAM scheme used in the FQAM modulator 302, and outputs the de-modulated FQAM symbols to the non-binary channel decoder 308. The non-binary channel decoder 308 decodes the de-modulated FQAM symbols.

The transmitter/receiver in FIG. 3 has a relatively high frequency efficiency, and enables that an interference signal becomes non-Gaussian. Further, the transmitter/receiver in FIG. 3 acquires a decoding performance better than a decoding performance of a conventional QAM scheme in an environment of a severe interference.

As described above, in order to acquire a better performance when a non-binary code is used in a transmitter/receiver, a non-binary code of a large alphabet size is used. However, a complexity of the non-binary code exponentially increases in proportion to an alphabet size, so a performance in the transmitter/receiver is limited due to a processing complexity.

Figure 4:
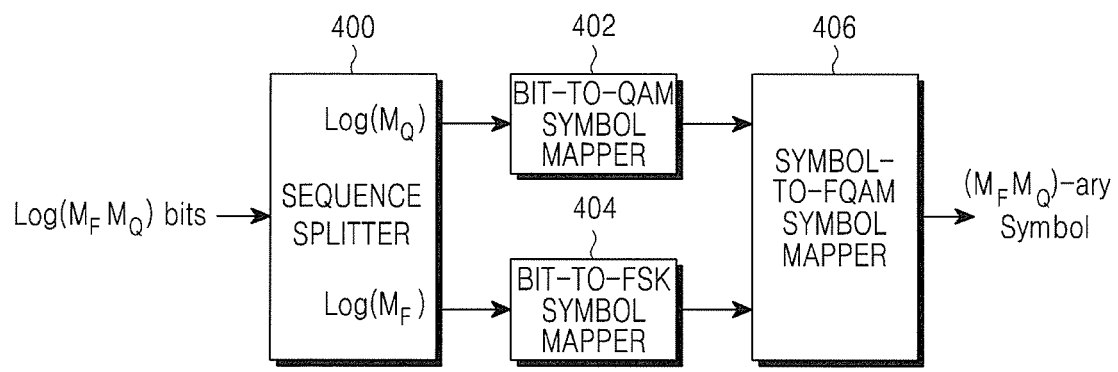
FIG. 4 schematically illustrates an inner structure of an FQAM modulator used in a wireless communication system supporting a conventional FQAM scheme.

A structure of the FQAM modulation 302 in FIG. 3 is illustrated in FIG. 4.

FIG. 4 schematically illustrates an inner structure of an FQAM modulator used in a wireless communication system supporting a conventional FQAM scheme.

Referring to FIG. 4, an FQAM modulator includes a sequence splitter 400, a bit-to-QAM symbol mapper 402, a bit-to-FSK symbol mapper 404, and a symbol-to-FQAM symbol mapper 406.

Upon inputting a bit stream, the sequence splitter 400 splits bits included in the bit stream into bits on which a QAM scheme will be performed and bits on which an FSFK scheme will be performed. The sequence splitter 400 outputs the bits on which the QAM scheme will be performed to the bit-to-QAM symbol mapper 402, and outputs the bits on which the FSFK scheme will be performed to the bit-to-FSK symbol mapper 404. The bit-to-QAM symbol mapper 402 generates a QAM symbol by performing a modulation operation on input bits based on a QAM scheme, and outputs the generated QAM symbol to the symbol-to-FQAM symbol mapper 406. The bit-to-FSK symbol mapper 404 generates an FSK symbol by performing a modulation operation on input bits based on an FSK scheme, and outputs the generated FSK symbol to the symbol-to-FQAM symbol mapper 406. The generated QAM symbol and FSK symbol are combined and transmitted in the symbol-to-FQAM symbol mapper 406.

In the FQAM modulator in FIG. 4, an FSK tone carries a QAM symbol, so QAM symbols and FSK symbols are mapped to an FQAM symbol after a bit mapping for a part corresponding to a QAM scheme and a part corresponding to an FSK scheme is performed. An example of a result of this mapping operation is illustrated in FIG. 5.

Figure 5:
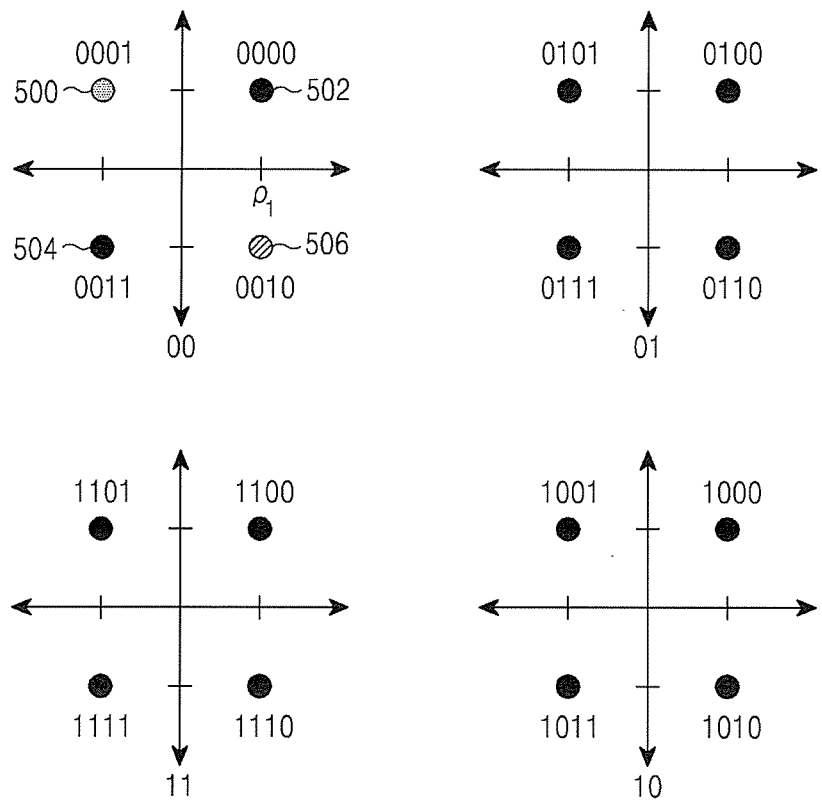
FIG. 5 schematically illustrates a bit mapping result when an FQAM scheme is used in a conventional wireless communication system.

FIG. 5 schematically illustrates a bit mapping result when an FQAM scheme is used in a conventional wireless communication system.

Referring to FIG. 5, the first symbol (0010) 506 to which the first bit sequence is allocated is a QAM symbol, and the second symbol (0001) 500 to which the second bit sequence is allocated, the third symbol (0000) 502 to which the third bit sequence is allocated, the fourth symbol (0011) 504 to which the fourth bit sequence is allocated, and remaining symbols are FSK symbols.

As described in FIG. 5, if a conventional FQAM bit mapping operation is performed, QAM symbols and FSK symbols independently exist, and a bit sequence of the longest Hamming distance is mapped to an adjacent symbol. For example, a bit sequence of a Hamming distance from bit sequence which is mapped to the second symbol 500 is maximized is mapped to one of the third symbol 502 and the fourth symbol 504 as adjacent symbols of the second symbol 500. If the longest Hamming distance is mapped to an adjacent symbol, performance degradation increases. So, an FQAM scheme which uses a non-binary code of which a decoding performance is not influenced according to a Hamming distance may be considered. However, if the non-binary code is used, a performance of an FQAM scheme is limited due to a processing complexity. This is why a complexity of the non-binary code exponentially increases in proportion to an alphabet size.

Many schemes which map bits to a symbol have been proposed. The many schemes have been proposed for a QAM scheme or a phase shift keying (PSK) scheme.

It may not be possible that a bit mapping scheme proposed for a specific modulation scheme is used for other modulation scheme. So, bit mapping schemes proposed for a QAM scheme or a PSK scheme may not be used for an FQAM scheme. In an FSK scheme, all symbols have the same Euclidean distance, so a bit mapping scheme is not at all effective. The FQAM scheme is new or newly focused modulation scheme, so there may be a need for a bit mapping scheme appropriate for the FQAM scheme. However, the bit mapping scheme appropriate for the FQAM scheme has not been proposed at present.

An embodiment of the present disclosure proposes a direct-bit-mapped-FQAM (DBM FQAM) method and apparatus thereby directly mapping a bit sequence to an FQAM symbol.

An inner structure of a DBM FQAM modulator in a wireless communication system according to an embodiment of the present disclosure will be described with reference to FIG. 6.

Figure 6:
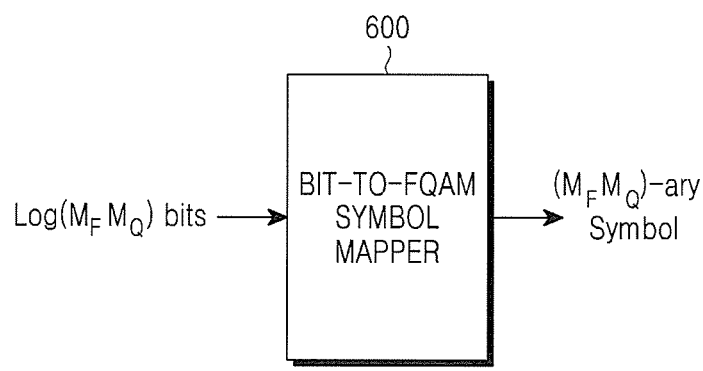
FIG. 6 schematically illustrates an inner structure of a DBM FQAM modulator in a wireless communication system according to an embodiment of the present disclosure.

FIG. 6 schematically illustrates an inner structure of a DBM FQAM modulator in a wireless communication system according to an embodiment of the present disclosure.

Referring to FIG. 6, the DBM FQAM modulator includes a bit-to-FQAM symbol mapper 600. Upon inputting a binary bit stream, the bit-to-FQAM symbol mapper 600 maps bits included in the binary bit stream to an FQAM symbol to output the FQAM symbol. According to this structure, the DBM FQAM modulator may perform a bit-to-symbol mapping operation with a simple format compared with a conventional FQAM modulator, so latency may be decreased.

An example of a bit mapping result of the DBM FQAM modulator will be described in FIG. 7.

Figure 7:
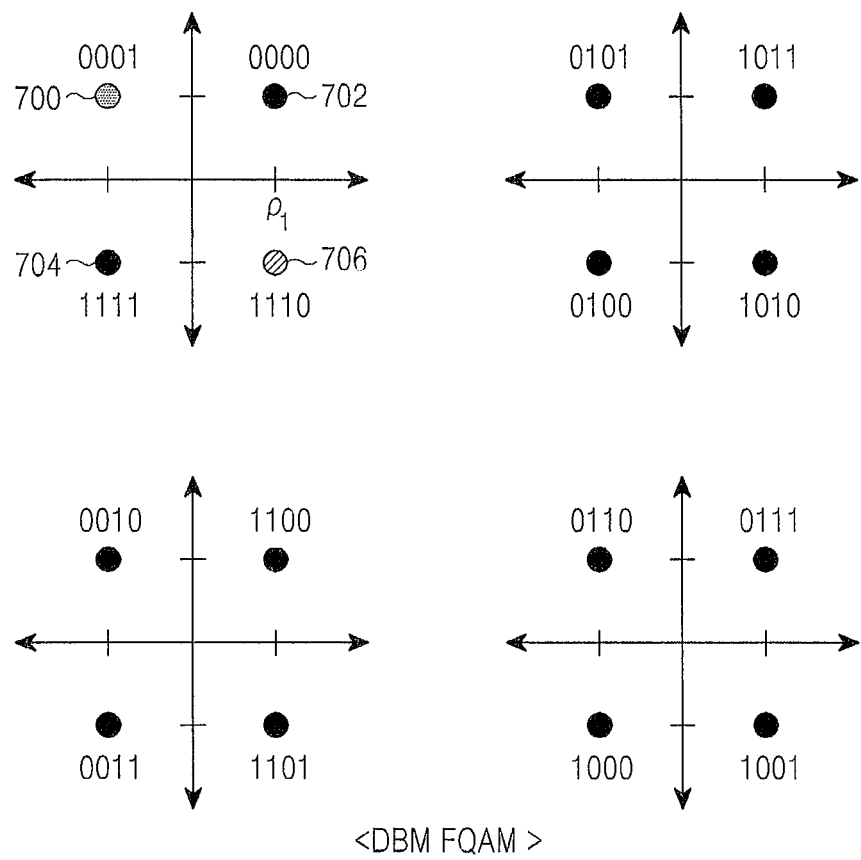
FIG. 7 schematically illustrates a bit mapping result of a DBM FQAM modulator in a wireless communication system according to an embodiment of the present disclosure.

FIG. 7 schematically illustrates a bit mapping result of a DBM FQAM modulator in a wireless communication system according to an embodiment of the present disclosure.

Referring to FIG. 7, the first symbol (1110) 706 to which the first bit sequence is allocated is a QAM symbol, and the second symbol (0001) 700 to which the second bit sequence is allocated, the third symbol (0000) 702 to which the third bit sequence is allocated, the fourth symbol (1111) 704 to which the fourth bit sequence is allocated, and remaining symbols are FSK symbols.

For example, a maximum distance between symbols in FIG. 7 may be (2+ the number of FSK bits−1). Generally, if an FQAM scheme is used, a maximum distance between adjacent symbols is (2+ the number of FSK bits). So a better performance may be acquired if a DBM FQAM bit mapping method proposed in an embodiment of the present disclosure is used.

In order to acquire more efficient performance, in an embodiment of the present disclosure, a scheme (hereinafter called 'Gray-DBM FQAM scheme') which performs a Gray coding scheme on the number equal to the number of QAM bits of bits, and performs bit-to-symbol mapping operation in order to maximize a Hamming distance between symbols which exist on quadrants which are the most far each other on the same frequency may be used.

An example of a bit mapping result of the Gray-DBM FQAM scheme will be described in FIGS. 8 and 9.

A bit mapping result of a Gray-DBM FQAM (16-FQAM) scheme in a wireless communication system according to an embodiment of the present disclosure will be described with reference to FIG. 8.

Figure 8:
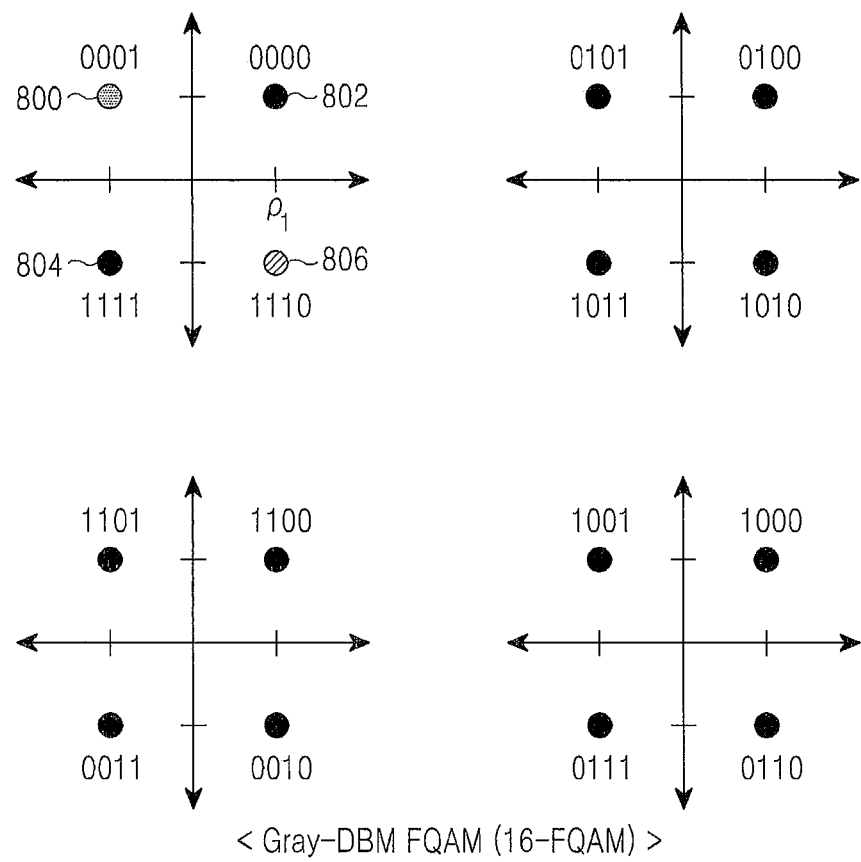
FIG. 8 schematically illustrates a bit mapping result of a Gray-DBM FQAM (16-FQAM) scheme in a wireless communication system according to an embodiment of the present disclosure.

FIG. 8 schematically illustrates a bit mapping result of a Gray-DBM FQAM (16-FQAM) scheme in a wireless communication system according to an embodiment of the present disclosure.

Referring to FIG. 8, if one symbol includes four bits, and the third and fourth bits among the four bits are QAM bits, a Gray coding scheme (in order that Hamming distances among all adjacent symbols are '1') may be performed for the third and fourth bits. For example, the third and fourth bits included in each of the first symbol 800 and the second symbol 802 are mapped thereby having one bit difference (i.e., with a Hamming distance of 1) each other. If the first and second bits among the four bits exit an opposite quadrant each other on the same frequency domain, the first and second bits are mapped thereby a Hamming distance is maximized. For example, the first and second bits included in each of the second symbol 802 and the third symbol 804 are mapped thereby a Hamming distance is 2.

A bit mapping result of a Gray-DBM FQAM (16-FQAM) scheme in a wireless communication system according to an embodiment of the present disclosure has been described with reference to FIG. 8, and a bit mapping result of a Gray-DBM FQAM (32-FQAM) scheme in a wireless communication system according to an embodiment of the present disclosure will be described with reference to FIG. 9.

Figure 9:
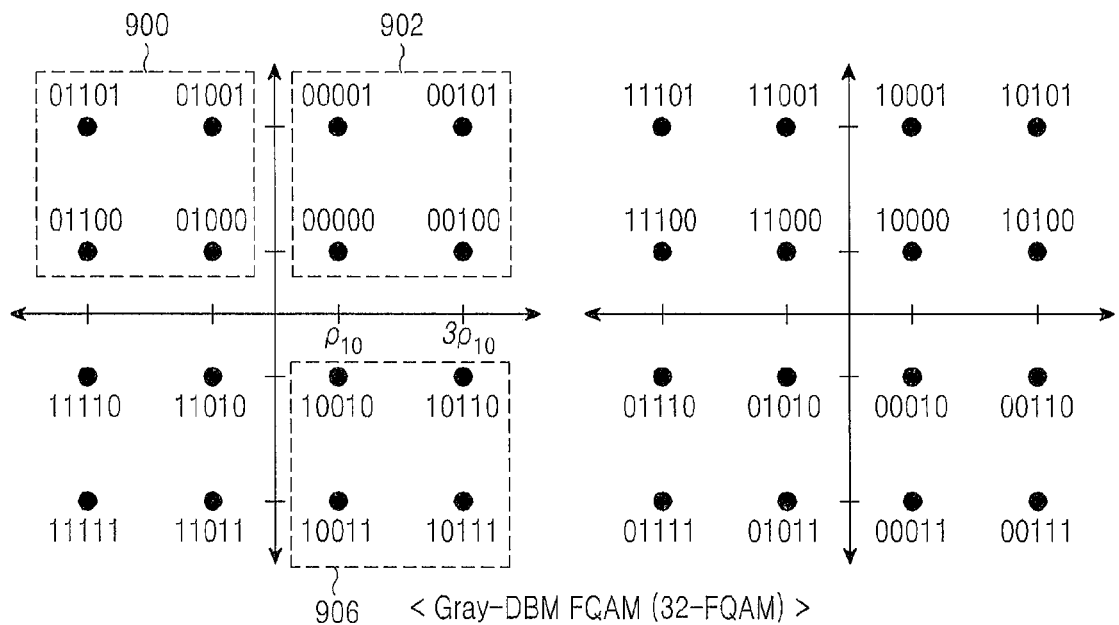
FIG. 9 schematically illustrates a bit mapping result of a Gray-DBM FQAM (32-FQAM) scheme in a wireless communication system according to an embodiment of the present disclosure.

FIG. 9 schematically illustrates a bit mapping result of a Gray-DBM FQAM (32-FQAM) scheme in a wireless communication system according to an embodiment of the present disclosure.

Referring to FIG. 9, if one symbol includes five bits and the third bit, the fourth bit, and the fifth bit among the five bits, a Gray coding operation may be performed on the third bit, the fourth bit, and the fifth bit. For example, a mapping operation is performed thereby a Hamming distance of each of the third bit, the fourth bit, and the fifth bit included in each of adjacent symbols "01101", "01001" is "1". Similarly, a mapping operation is performed thereby a Hamming distance of each of the third bit, the fourth bit, and the fifth bit included in each of adjacent symbols "01101" of the first symbol group 900, "01001" of the second symbol group 902 is "1".

Symbol groups which exit on an opposite quadrant each other on the same frequency domain among four symbols groups in each quadrant are mapped thereby Hamming distances of the first and second bits included in each of symbols included in a related symbol group are maximized. For example, the first and second bits included in each of symbols included in the first symbol group 900 and the third symbol group 906 may be mapped thereby Hamming distances of the first and second bits included in each of the symbols included in the first symbol group 900 and the third symbol group 906 are 2.

A structure of a transmitter/receiver in a wireless communication system supporting a Gray-DBM FQAM scheme according to an embodiment of the present disclosure will be described with reference to FIG. 10.

Figure 10:
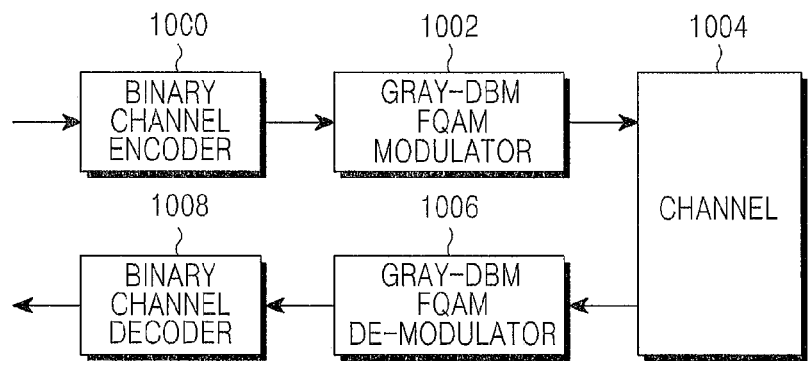
FIG. 10 schematically illustrates a structure of a transmitter/receiver in a wireless communication system supporting a Gray-DBM FQAM scheme according to an embodiment of the present disclosure.

FIG. 10 schematically illustrates a structure of a transmitter/receiver in a wireless communication system supporting a Gray-DBM FQAM scheme according to an embodiment of the present disclosure.

Referring to FIG. 10, a transmitter includes a binary channel encoder 1000, and a Gray-DBM FQAM modulator 1002, and a receiver includes a Gray-DBM FQAM de-modulator 1006, and a binary channel decoder 1008.

Firstly, a structure of the transmitter will be described. Upon inputting a binary bit stream to be transmitted, the binary channel encoder 1000 encodes the input binary bit stream using a preset encoding scheme to generate an encoded binary bit stream, and outputs the encoded binary bit stream to the Gray-DBM FQAM modulator 1002. For example, if the input binary bit stream is "1011001 . . . ", the input binary bit stream "1011001 . . . " may be an encoded binary bit stream as "110101011011 . . . ".

The Gray-DBM FQAM modulator 1002 modulates bits included in the encoded binary bit stream based on a Gray-DBM FQAM scheme to generate modulated symbols. For example, if the Gray-DBM FQAM modulator 1002 uses an 8 FQAM scheme and an encoded binary bit stream "110101011011 . . . " is input, the Gray-DBM FQAM modulator 1002 may output "[0, 1−j], [0, −1+j], [−1−j,0], [−1−j, 0] . . . " as a modulated symbol.

As described above, the Gray-DBM FQAM modulator 1002 performs a Gray coding operation on the number equal to the number of QAM bits of bits to map the bits to a related symbol, and maps the number equal to the number of FSK bits of bits to symbols thereby a Hamming distance between symbols which exist on quadrants which are the most far on the same frequency is maximized. An example of a bit mapping result of the Gray-DBM FQAM modulator 1002 is expressed in Table 1.

TABLE 1

| 001 | 000 | | 101 | 100 |
|---|---|---|---|---|
| [−1 + j, 0] ◯ | ◯ [1 + j, 0] | | [0, −1 + j] ◯ | ◯ [0, 1 + j] |
| [−1 − j, 0] ◯ | ◯ [1 − j, 0] | | [0, −1 − j] ◯ | ◯ [0, 1 − j] |
| 011 | 010 | | 111 | 110 |

The modulated symbols "[0, 1−j], [0, −1+j], [−1−j,0], [−1−j,0] . . . " may be digital-to-analog converted to be transmitted to the receiver through a channel 1004.

The modulated symbols are received in the receiver through the channel 1004; the modulated symbols are analog-to-digital converted and output to the Gray-DBM FQAM de-modulator 1006. The Gray-DBM FQAM de-modulator 1006 de-modulates the received symbols corresponding to the Gray-DBM FQAM scheme used in the Gray-DBM FQAM modulator 1002 to generate de-modulated bits, and outputs the de-modulated bits to the binary channel decoder 1008. The binary channel decoder 1008 decodes the de-modulated bits corresponding to the encoding scheme used in the binary channel encoder 1000.

While the binary channel encoder 1000 and the Gray-DBM FQAM modulator 1002 are shown in FIG. 10 as separate units, it is to be understood that this is merely for convenience of description. In other words, the binary channel encoder 1000 and the Gray-DBM FQAM modulator 1002 may be incorporated into a single unit. While the Gray-DBM FQAM de-modulator 1006 and the binary channel decoder 1008 are shown in FIG. 10 as separate units, it is to be understood that this is merely for convenience of description. In other words, the Gray-DBM FQAM de-modulator 1006 and the binary channel decoder 1008 may be incorporated into a single unit.

A structure of a transmitter/receiver in a wireless communication system supporting a Gray-DBM FQAM scheme according to an embodiment of the present disclosure has been described with reference to FIG. 10, and an operating process of a transmitter in a wireless communication system supporting a Gray-DBM FQAM scheme according to an embodiment of the present disclosure will be described with reference to FIG. 11.

Figure 11:
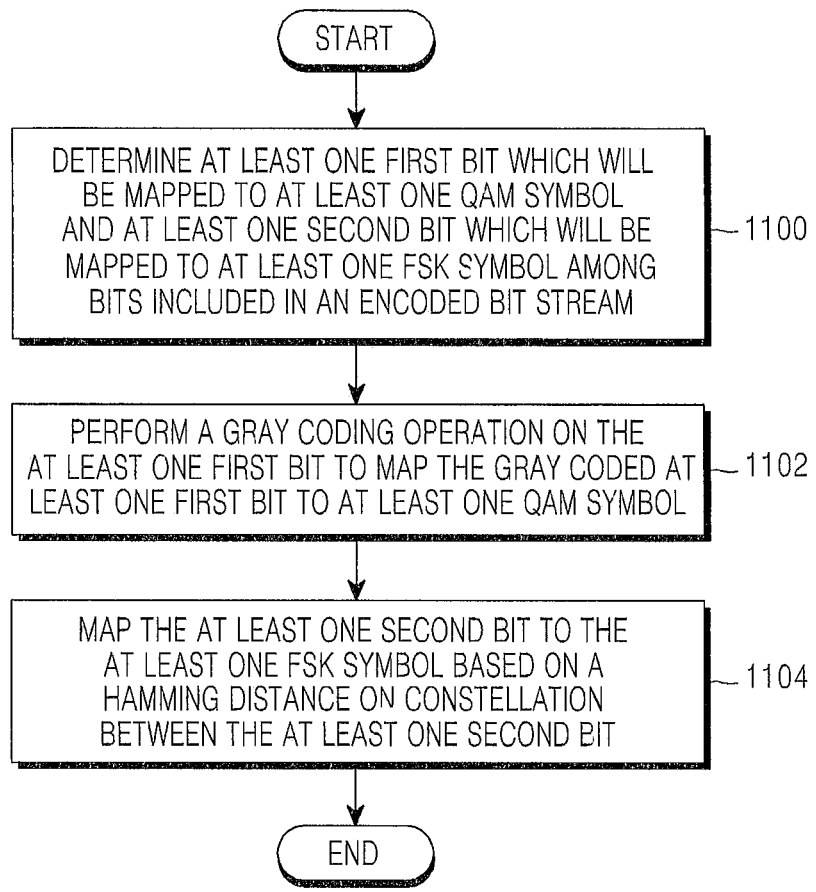
FIG. 11 schematically illustrates an operating process of a transmitter in a wireless communication system supporting a Gray-DBM FQAM scheme according to an embodiment of the present disclosure.

FIG. 11 schematically illustrates an operating process of a transmitter in a wireless communication system supporting a Gray-DBM FQAM scheme according to an embodiment of the present disclosure.

Referring to FIG. 11, the transmitter determines at least one first bit which will be mapped to at least one QAM symbol and at least one second bit which will be mapped to at least one FSK symbol among bits included in an encoded bit stream at operation 1100.

The transmitter performs a Gray coding operation on the at least one first bit to map the Gray coded at least one first bit to at least one QAM symbol at operation 1102.

The transmitter maps the at least one second bit to the at least one FSK symbol based on a Hamming distance on constellation between the at least one second bit at operation 1104. That is, the transmitter maps bits of which Hamming distances are the longest to symbols which are the most far each other within a quadrant of the constellation.

Although FIG. 11 illustrates an operating process of a transmitter in a wireless communication system supporting a Gray-DBM FQAM scheme according to an embodiment of the present disclosure, various changes could be made to FIG. 11. For example, while shown as a series of operations, various operations in FIG. 11 could overlap, occur in parallel, occur in a different order, or occur multiple times.

An operating process of a transmitter in a wireless communication system supporting a Gray-DBM FQAM scheme according to an embodiment of the present disclosure has been described with reference to FIG. 11, and a performance when a binary code is applied on a conventional FQAM scheme and a performance when a binary code is applied on a DBM FQAM scheme and a Gray-DBM FQAM scheme proposed in an embodiment of the present disclosure will be described with reference to FIGS. 12 and 13.

A performance when a DBM 4FQAM scheme according to an embodiment of the present disclosure is used compared with a performance when a conventional 4FQAM scheme is used in a wireless communication system will be described with reference to FIG. 12.

Figure 12:
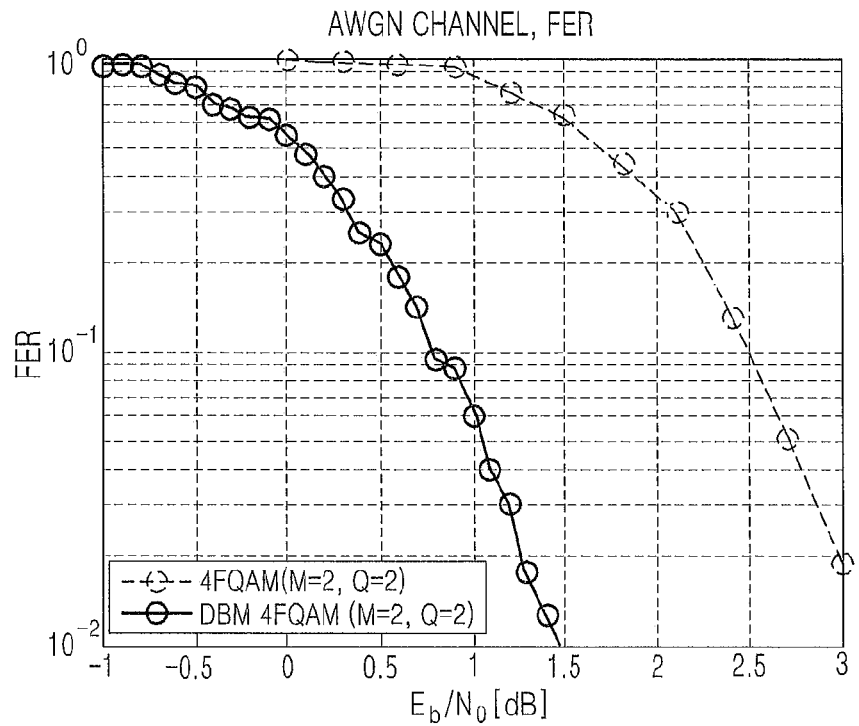
FIG. 12 is a graph illustrating a performance when a DBM 4FQAM scheme according to an embodiment of the present disclosure is used compared with a performance when a conventional 4FQAM scheme is used in a wireless communication system.

FIG. 12 is a graph illustrating a performance when a DBM 4FQAM scheme according to an embodiment of the present disclosure is used compared with a performance when a conventional 4FQAM scheme is used in a wireless communication system.

A frame error rate (FER) per signal to noise ratio (SNR) when both an FSK order and a QAM order are "2" is illustrated in FIG. 12. In FIG. 12, Q denotes an FSK order, and M denotes a QAM order.

Further, it will be noted that a performance when a DBM 4FQAM scheme according to an embodiment of the present disclosure is used and a performance when a conventional 4FQAM scheme is used are acquired in an additive white Gaussian noise (AGWN) channel environment.

A performance when a DBM 4FQAM scheme according to an embodiment of the present disclosure is used compared with a performance when a conventional 4FQAM scheme is used in a wireless communication system has been described with reference to FIG. 12, and a performance when a Gray DBM 8FQAM scheme according to an embodiment of the present disclosure is used compared with a performance when a conventional 8FQAM scheme is used in a wireless communication system will be described with reference to FIG. 13.

Figure 13:
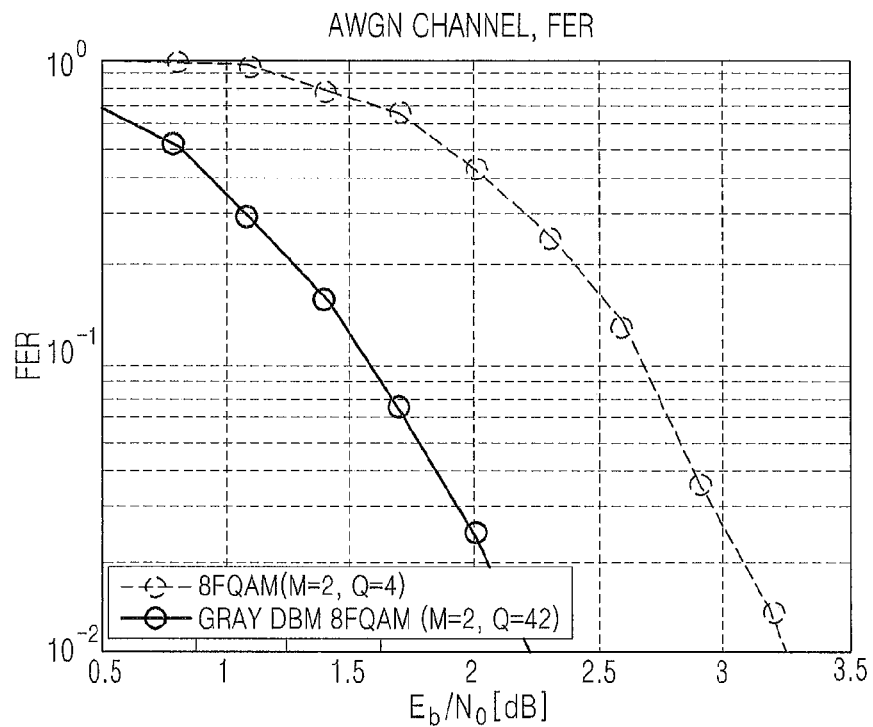
FIG. 13 is a graph illustrating a performance when a Gray DBM 8FQAM scheme according to an embodiment of the present disclosure is used compared with a performance when a conventional 8FQAM scheme is used in a wireless communication system.

FIG. 13 is a graph illustrating a performance when a Gray DBM 8FQAM scheme according to an embodiment of the present disclosure is used compared with a performance when a conventional 8FQAM scheme is used in a wireless communication system.

An FER per SNR when an FSK order is "2", and a QAM order is "4" is illustrated in FIG. 13. In FIG. 13, Q denotes an FSK order, and M denotes a QAM order.

Further, it will be noted that a performance when a Gray DBM 8FQAM scheme according to an embodiment of the present disclosure is used and a performance when a conventional 8FQAM scheme is used are acquired in an AGWN channel environment.

As illustrated in FIGS. 12 and 13, when a DBM FQAM scheme and a Gray-DBM FQAM scheme proposed in an embodiment of the present disclosure, it will be understood that performance degradation decreases compared when a conventional FQAM scheme is used.

As is apparent from the foregoing description, an embodiment of the present disclosure enables to transmit/receive a signal in a wireless communication system supporting an FQAM scheme thereby enhancing a bit-to-symbol mapping performance An embodiment of the present disclosure enables to transmit/receive a signal in a wireless communication system supporting an FQAM scheme thereby decreasing a processing complexity.

An embodiment of the present disclosure enables to transmit/receive a signal using a binary code in a wireless communication system supporting an FQAM scheme.

An embodiment of the present disclosure enables to transmit/receive a signal in a wireless communication system supporting an FQAM scheme thereby directly mapping a bit sequence to an FQAM symbol.

An embodiment of the present disclosure enables to transmit/receive a signal in a wireless communication system supporting an FQAM scheme thereby directly mapping a bit sequence to an FQAM symbol and enhancing a bit-to-symbol mapping performance.

An embodiment of the present disclosure enables to transmit/receive a signal in a wireless communication system supporting an FQAM scheme thereby directly mapping a bit sequence to an FQAM symbol and decreasing a processing complexity.

An embodiment of the present disclosure enables to transmit/receive a signal in a wireless communication system supporting an FQAM scheme thereby directly mapping a bit sequence to an FQAM symbol and decreasing latency.

Certain aspects of the present disclosure may also be embodied as computer readable code on a computer readable recording medium. A computer readable recording medium is any data storage device that can store data, which can be thereafter read by a computer system, Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems such that the computer readable code is stored and executed in a distributed fashion. Also, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable read only memory (ROM), a memory, for example, a random access memory (RAM, a memory chip, a memory device, or a memory integrated circuit (IC), or an optically or magnetically recordable non-transitory machine-readable, e.g., computer-readable, storage medium, e.g., a compact disk (CD), a digital versatile disk (DVD), a magnetic disk, or a magnetic tape. A method and apparatus according to an embodiment of the present disclosure may be implemented by a computer or a mobile terminal that includes a controller and a memory, and the memory may be an example of a non-transitory machine-readable, e.g., computer-readable, storage medium suitable to store a program or programs including instructions for implementing various embodiments of the present disclosure.

The present disclosure may include a program including code for implementing the apparatus and method as defined by the appended claims, and a non-transitory machine-readable, e.g., computer-readable, storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a signal by a transmitting apparatus in a wireless communication system supporting a hybrid frequency shift keying (FSK) and quadrature amplitude modulation (QAM) modulation (FQAM) scheme, the method comprising:

determining, by the transmitting apparatus, at least one first bit to map to at least one QAM symbol and at least one second bit to map to at least one FSK symbol among bits in an encoded binary bit stream;

generating, by the transmitting apparatus, a FQAM modulation symbol by mapping the at least one first bit to the at least one QAM symbol and mapping the at least one second bit to the at least one FSK symbol, and transmitting, by the transmitting apparatus, the signal that is based on the generated FQAM modulation symbol.

2. The method of claim 1, wherein the mapping of the at least one second bit to the at least one FSK symbol comprises:
mapping the at least one second bit to the at least one FSK symbol thereby maximizing a Hamming distance between bits of which lengths on a constellation are greatest.

3. The method of claim 1, wherein the at least one QAM symbol to which the at least one first bit is mapped and the at least one FSK symbol to which the at least one second bit is mapped comprise a Hamming distance expressed as $$H=2+N-1,$$

where H denotes the Hamming distance of each of the at least one QAM symbol to which the at least one first bit is mapped and the at least one FSK symbol to which the at least one second bit is mapped, and N denotes a number of the at least one second bit.

4. The method of claim 1, further comprising:
before mapping the at least one first bit to the at least one QAM symbol, performing a Gray coding operation on the at least one first bit.

5. The method of claim 1, wherein the generating of the FQAM modulation symbol is based on a Hamming distance of the at least one second bit.

6. A method for receiving a signal by a receiving apparatus in a wireless communication system supporting a hybrid frequency shift keying (FSK) and quadrature amplitude modulation (QAM) modulation (FQAM) scheme, the method comprising:
receiving the signal from a transmitting apparatus,
wherein the signal is generated by the transmitting apparatus based on a FQAM modulation symbol, and
wherein the transmitting apparatus determines at least one first bit to map to at least one QAM symbol and at least one second bit to map to at least one FSK symbol among bits in an encoded binary bit stream, and generates the FQAM modulation symbol by mapping the at least one first bit to the at least one QAM symbol and mapping the at least one second bit to the at least one FSK symbol.

7. The method of claim 6, wherein the operation of mapping the at least one second bit to the at least one FSK symbol comprises an operation of mapping the at least one second bit to the at least one FSK symbol thereby maximizing a Hamming distance between bits of which lengths on a constellation are greatest.

8. The method of claim 6, wherein the at least one QAM symbol to which the at least one first bit is mapped and the at least one FSK symbol to which the at least one second bit is mapped comprise a Hamming distance expressed as $$H=2+N-1,$$

where H denotes the Hamming distance of each of the at least one QAM symbol to which the at least one first bit is mapped and the at least one FSK symbol to which the at least one second bit is mapped, and N denotes a number of the at least one second bit.

9. The method of claim 6, wherein the transmitting apparatus performs a Gray coding operation on the at least one first bit before mapping the at least one first bit to the at least one QAM symbol.

10. The method of claim 6, wherein the transmitting apparatus generates the FQAM modulation symbol based on a Hamming distance of the at least one second bit.

11. A transmitting apparatus for transmitting a signal in a wireless communication system supporting a hybrid frequency shift keying (FSK) and quadrature amplitude modulation (QAM) modulation (FQAM) scheme, the transmitting apparatus comprising:
an encoder configured to encode binary bit stream; and
a modulator configured to determine at least one first bit to map to at least one QAM symbol and at least one second bit to map to at least one FSK symbol among bits in an encoded binary bit stream, and generate an FQAM modulation symbol by mapping the at least one first bit to the at least one QAM symbol and mapping the at least one second bit to the at least one FSK symbol, and
a transmitter configured to transmit the signal that is based on the generated FQAM modulation symbol.

12. The transmitting apparatus of claim 11, wherein modulator if further configured to map the at least one second bit to the at least one FSK symbol thereby maximizing a Hamming distance between bits of which lengths on a constellation are greatest.

13. The transmitting apparatus of claim 11, wherein the at least one QAM symbol to which the at least one first bit is mapped and the at least one FSK symbol to which the at least one second bit is mapped comprise a Hamming distance expressed as $$H=2+N-1,$$

where H denotes the Hamming distance of each of the at least one QAM symbol to which the at least one first bit is mapped and the at least one FSK symbol to which the at least one second bit is mapped, and N denotes a number of the at least one second bit.

14. The transmitting apparatus of claim 11, wherein the modulator performs a Gray coding operation on the at least one first bit before mapping the at least one first bit to the at least one QAM symbol.

15. The transmitting apparatus of claim 11, wherein the modulator is configured to generate the FQAM modulation symbol based on a Hamming distance of the at least one second bit.

16. A receiving apparatus for receiving a signal in a wireless communication system supporting a hybrid frequency shift keying (FSK) and quadrature amplitude modulation (QAM) modulation (FQAM) scheme, the receiving apparatus comprising:
a receiver configured to receive the signal from a transmitting apparatus,
wherein the signal is generated by the transmitting apparatus based on a FQAM modulation symbol, and
wherein the transmitting apparatus determines at least one first bit to map to at least one QAM symbol and at least one second bit to map to at least one FSK symbol among bits in an encoded binary bit stream, and generates the FQAM modulation symbol by mapping the at least one first bit to the at least one QAM symbol and mapping the at least one second bit to the at least one FSK symbol.

17. The receiving apparatus of claim 16, wherein the operation of mapping the at least one second bit to the at least one FSK symbol comprises an operation of mapping the at least one second bit to the at least one FSK symbol thereby maximizing a Hamming distance between bits of which lengths on a constellation are greatest.

18. The receiving apparatus of claim 16, wherein the at least one QAM symbol to which the at least one first bit is mapped and the at least one FSK symbol to which the at least one second bit is mapped comprise a Hamming distance expressed as $$H=2+N-1,$$

where, H denotes the Hamming distance of each of the at least one QAM symbol to which the at least one first bit is mapped and the at least one FSK symbol to which the at least one second bit is mapped, and N denotes a number of the at least one second bit.

19. The receiving apparatus of claim 16, further comprising:
a de-modulator configured to de-modulate the signal.

20. The receiving apparatus of claim 16, wherein the transmitting apparatus performs a Gray coding operation on the at least one first bit before mapping the at least one first bit to the at least one QAM symbol.

21. The receiving apparatus of claim 16, wherein the transmitting apparatus generates the FQAM modulation symbol based on a Hamming distance of the at least one second bit.

* * * * *